(12) United States Patent
Weinert

(10) Patent No.: US 10,514,176 B2
(45) Date of Patent: Dec. 24, 2019

(54) SYSTEMS AND METHODS FOR REFRIGERANT LEAK MANAGEMENT

(71) Applicant: Johnson Controls Technology Company, Auburn Hills, MI (US)

(72) Inventor: Jamie Weinert, Escanaba, MI (US)

(73) Assignee: Johnson Controls Technology Company, Auburn Hills, MI (US)

(*) Notice: Subject to any disclaimer, the term of this patent is extended or adjusted under 35 U.S.C. 154(b) by 158 days.

(21) Appl. No.: 15/871,685

(22) Filed: Jan. 15, 2018

(65) Prior Publication Data

US 2019/0170383 A1 Jun. 6, 2019

Related U.S. Application Data

(60) Provisional application No. 62/593,600, filed on Dec. 1, 2017.

(51) Int. Cl.

| F24F 11/02 | (2006.01) |
|---|---|
| F24F 11/36 | (2018.01) |
| F25B 49/02 | (2006.01) |
| F25B 41/00 | (2006.01) |
| F24F 11/79 | (2018.01) |
| F24F 1/0041 | (2019.01) |
| F24F 110/65 | (2018.01) |

(52) U.S. Cl.
CPC ............ *F24F 11/36* (2018.01); *F24F 1/0041* (2019.02); *F24F 11/79* (2018.01); *F25B 41/00* (2013.01); *F25B 49/025* (2013.01); *F24F 2110/65* (2018.01); *F25B 2500/222* (2013.01)

(58) Field of Classification Search
CPC ... F24F 11/36; F24F 2110/65; F25B 2500/22; F25B 2500/222
See application file for complete search history.

(56) References Cited

U.S. PATENT DOCUMENTS

| 5,918,475 | A | * | 7/1999 | Sakakibara | ............ | B60H 1/008 |
|---|---|---|---|---|---|---|
| | | | | | | 62/126 |
| 6,286,326 | B1 | * | 9/2001 | Kopko | .................. | F25D 17/065 |
| | | | | | | 62/179 |
| 7,631,641 | B1 | * | 12/2009 | Goldman | ................ | F24F 7/013 |
| | | | | | | 126/629 |
| 9,459,013 | B2 | | 10/2016 | Yamashita et al. | | |
| 9,625,195 | B2 | | 4/2017 | Hiraki et al. | | |

(Continued)

FOREIGN PATENT DOCUMENTS

| EP | 2589900 | 5/2013 |
|---|---|---|
| EP | 3029397 | 6/2016 |

*Primary Examiner* — Jonathan Bradford
(74) *Attorney, Agent, or Firm* — Fletcher Yoder, P.C.

(57) ABSTRACT

A refrigerant leak management system includes a return inlet assembly and a purge exhaust outlet assembly. The system also includes a sensor configured to detect refrigerant proximate an air handling enclosure of a HVAC unit. The system further includes a controller configured to control the system to drive air from a conditioned interior space of a building into an external environment via the purge exhaust outlet assembly when the sensor detects the refrigerant proximate the air handling enclosure by: actuating the return inlet assembly to close the return inlet assembly, actuating the purge exhaust outlet assembly to open the purge exhaust outlet assembly, and activating a reversible supply fan of the HVAC unit in a reverse direction.

27 Claims, 9 Drawing Sheets

(56) References Cited

U.S. PATENT DOCUMENTS

2014/0360211 A1   12/2014  Hovel et al.
2016/0363358 A1*  12/2016  Papas .................... F25B 49/005
2018/0073762 A1*   3/2018  Yajima ..................... F24F 11/65

* cited by examiner

SYSTEMS AND METHODS FOR REFRIGERANT LEAK MANAGEMENT

CROSS-REFERENCE TO RELATED APPLICATION

This application is a Non-Provisional Applications claiming priority to U.S. Provisional Application No. 62/593,600, entitled "SYSTEMS AND METHODS FOR REFRIGERANT LEAK MANAGEMENT," filed Dec. 1, 2017, which is hereby incorporated by reference in its entirety for all purposes.

BACKGROUND

The present disclosure relates generally to heating, ventilating, and air conditioning (HVAC) systems, and more particularly to systems and methods for refrigerant leak management in HVAC systems.

Residential, light commercial, commercial, and industrial HVAC systems are used to control temperatures and air quality in residences and buildings. Generally, the HVAC systems may circulate a refrigerant through a refrigeration circuit between an evaporator, where the refrigerant absorbs heat and a condenser where the refrigerant releases heat. The refrigerant flowing within the refrigeration circuit is generally formulated to undergo phase changes within the normal operating temperatures and pressures of the system so that quantities of heat can be exchanged by virtue of the latent heat of vaporization of the refrigerant. As such, the refrigerant flowing within a HVAC system travels through multiple conduits and components of the refrigeration circuit. Inasmuch as refrigerant leaks compromise system performance or result in increased costs, it is accordingly desirable to provide detection and response systems and methods for the HVAC system to reliably detect and respond to any refrigerant leaks of the HVAC system.

SUMMARY

In one embodiment of the present disclosure, a refrigerant leak management system for a heating, ventilation, and air conditioning (HVAC) unit configured to provide a conditioned interior space of a building includes a return inlet assembly and a purge exhaust outlet assembly. The system also includes a sensor configured to detect refrigerant proximate an air handling enclosure of the HVAC unit. The system further includes a controller configured to control the system to drive air from the conditioned interior space of the building into an external environment via the purge exhaust outlet assembly when the sensor detects the refrigerant proximate the air handling enclosure by: actuating the return inlet assembly to close the return inlet assembly, actuating the purge exhaust outlet assembly to open the purge exhaust outlet assembly, and activating a reversible supply fan of the HVAC unit in a reverse direction.

In another embodiment of the present disclosure, an air handling system of a heating, ventilation, and air conditioning (HVAC) system configured to manage airflow with respect to a conditioned interior space of a building includes a return inlet having a return inlet assembly and a purge exhaust outlet having a purge exhaust outlet assembly. The air handling system includes a sensor configured to detect refrigerant proximate an air handling enclosure. The air handling system also includes a reversible supply fan configured to draw air from the conditioned interior space of the building when operating in a reverse direction. Additionally, the air handling system includes a controller configured to control the air handling system to purge the air into an external environment by operating the reversible supply fan in the reverse direction while the return inlet assembly is closed and the purge exhaust outlet assembly is open, in response to the sensor detecting the refrigerant proximate the air handling enclosure.

In a further embodiment of the present disclosure, a method of operating a heating, ventilation, and air conditioning (HVAC) system that provides a conditioned interior space of a building includes, in response to detecting refrigerant proximate an air handling enclosure of the HVAC system via a sensor, activating a reversible supply fan of the HVAC system in a reverse direction to draw a flow of air from the conditioned interior space of the building. The method also includes closing a return inlet assembly disposed at a return inlet of the air handling enclosure to impede the flow of air from returning to the conditioned interior space of the building. Additionally, the method includes opening a purge exhaust outlet assembly disposed at a purge exhaust outlet of the air handling enclosure to guide the flow of air to enter an external environment.

Other features and advantages of the present application will be apparent from the following, more detailed description of the embodiments, taken in conjunction with the accompanying drawings which illustrate, by way of example, the principles of the application.

DETAILED DESCRIPTION

Figure 1:
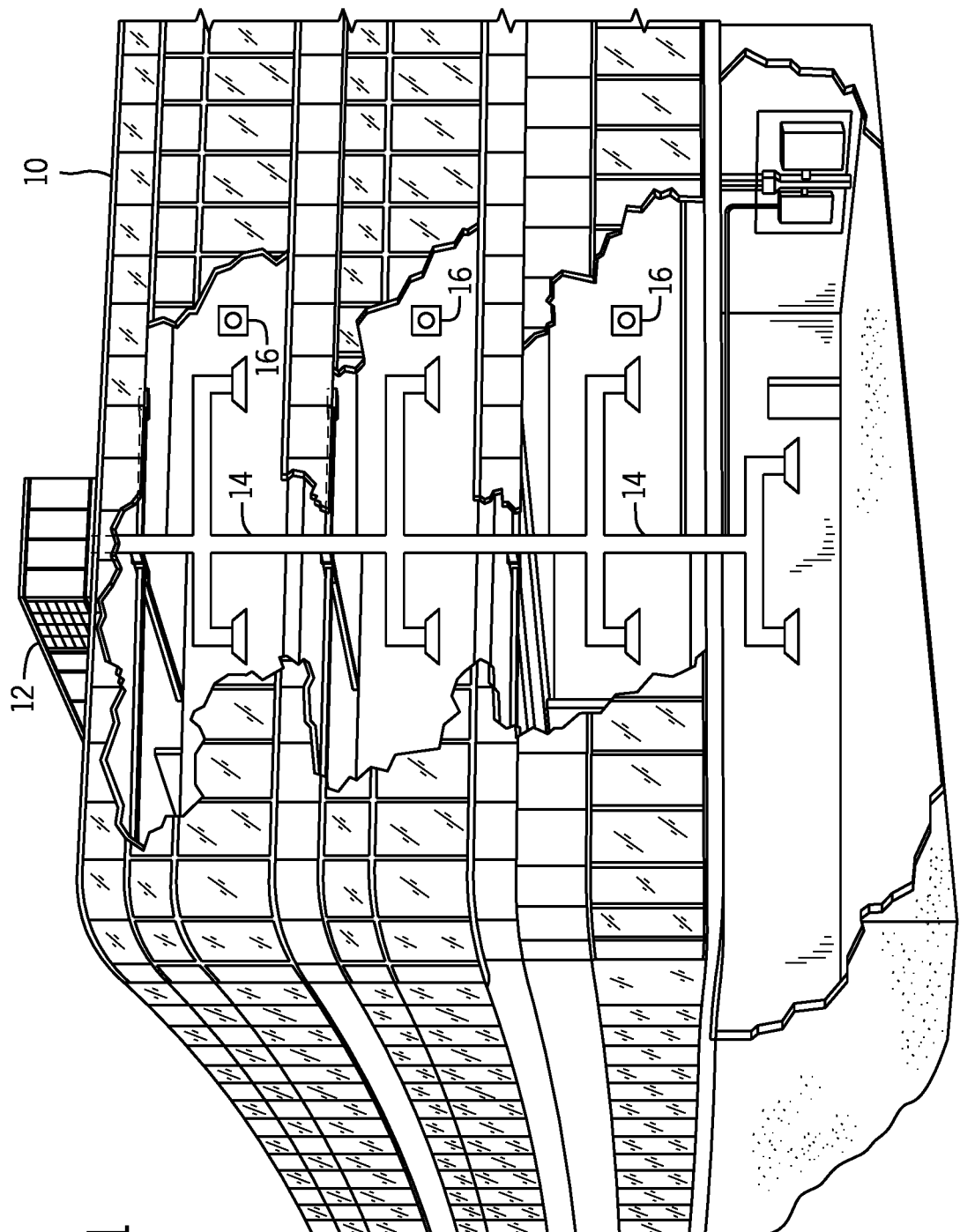
FIG. 1 is an illustration of an embodiment of a commercial or industrial HVAC system, in accordance with present techniques.

As discussed above, a HVAC system generally includes a refrigerant flowing within a refrigeration circuit. However, in certain embodiments, the refrigerant may inadvertently leak from a flow path of the refrigeration circuit due to wear or degradation to components, or imperfect joints or connections within the refrigeration circuit, at some point after installation. If undetected, leaking refrigerant may compromise system performance or result in increased costs. As such, present techniques enable HVAC systems to reliably detect and manage refrigerant leaks.

With the foregoing in mind, present embodiments are directed to a leak management system implemented in an air handling enclosure of a HVAC system, such as an air handling unit of a residential HVAC system or an air handling portion of a packaged HVAC system, as discussed below. More specifically, the disclosed air handling enclosure includes a number of airflow management assemblies positioned at various inlets and outlets of the air handling enclosure. The airflow management assemblies generally cooperate to enable the leak management system to effectively detect and mitigate refrigerant leaks within the enclosure. For example, the airflow management assemblies are capable of selectively directing an air flow within the air handling enclosure either to a conditioned interior space of a building or to an external environment relative to the conditioned interior space of the building.

Additionally, as discussed below, the leak management system may be operated in various modes, including an active detection mode and a leak response mode. For example, the leak management system may operate in an active detection mode to monitor refrigerant leaks both while the HVAC system is operating in an ON-cycle that actively conditions the interior space, and while the HVAC system is operating in an OFF-cycle that does not actively condition the interior space. Additionally, in active detection mode, a refrigerant gas concentration sensor measures a concentration of leaking refrigerant within the air handling enclosure. When a sufficient refrigerant leak is detected, the leak management system switches to leak response mode, in which one or more airflow management assemblies are adjusted to fluidly couple the interior of the air handling enclosure to the external environment, and a reversible supply fan within the enclosure is operated in a reverse direction. The reverse operation of the supply fan, in cooperation with the one or more airflow management assemblies, purges leaked refrigerant from the interior space of the air handling unit, from the building, and into the external environment. Indeed, the present embodiments of the leak management system are capable of purging the air from the building, such that the leaked refrigerant is removed from the building. In this manner, the disclosed techniques enable detection of leaked refrigerant within the air handling enclosure, and enable response via suitable control actions to address the leaked refrigerant.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes a HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
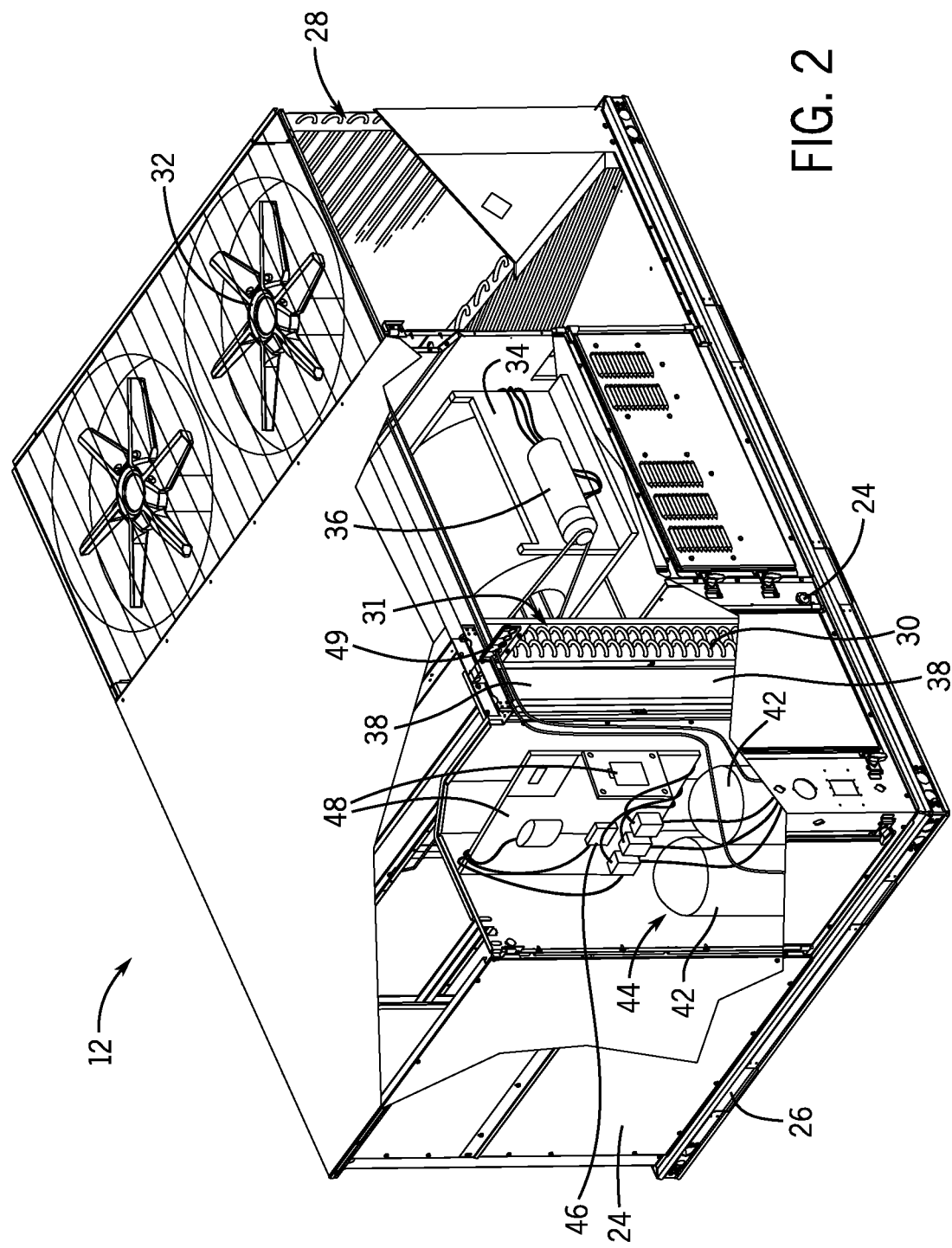
FIG. 2 is an illustration of an embodiment of a packaged unit of the HVAC system, in accordance with present techniques.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking mechanisms such as rain from leaking into the building 10.

The HVAC unit 12 includes heat exchangers 28 and 30 in fluid communication with one or more refrigeration circuits.

Tubes within the heat exchangers 28 and 30 may circulate refrigerant through the heat exchangers 28 and 30. For example, the refrigerant may be R-410A. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
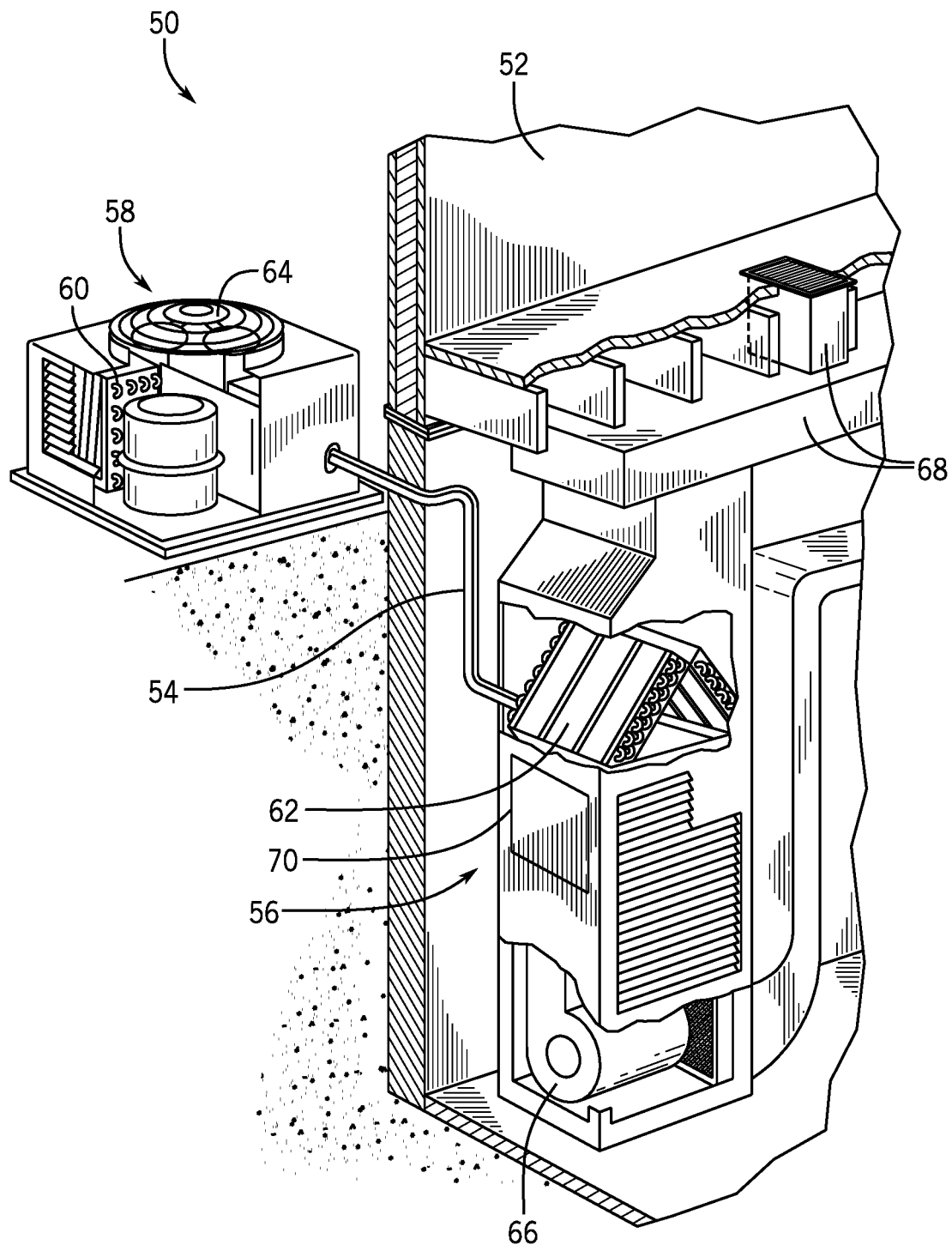
FIG. 3 is an illustration of an embodiment of a split-type HVAC system, in accordance with present techniques.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger that is separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
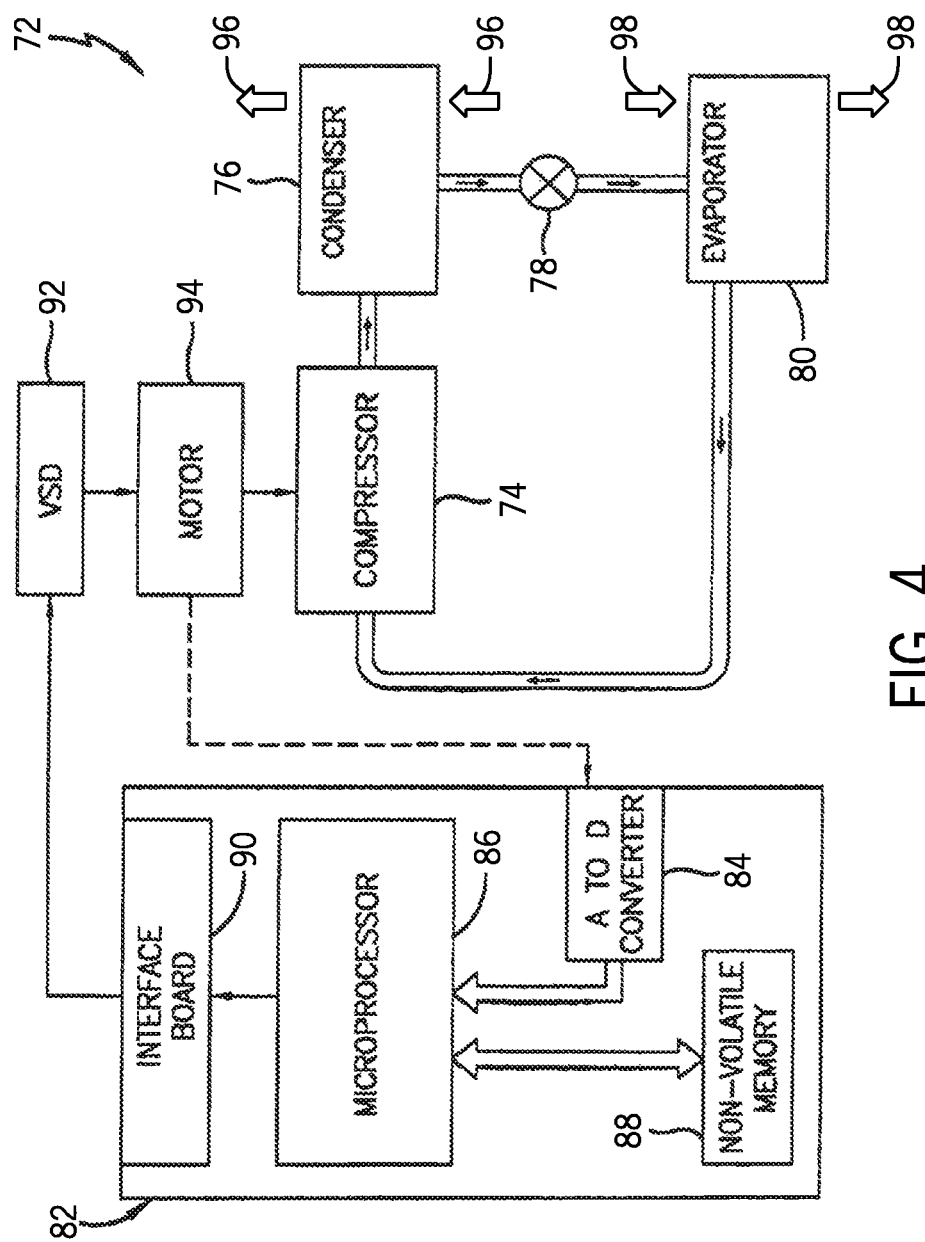
FIG. 4 is a schematic diagram of an embodiment of a refrigeration system of the HVAC system, in accordance with present techniques.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

Figure 5:
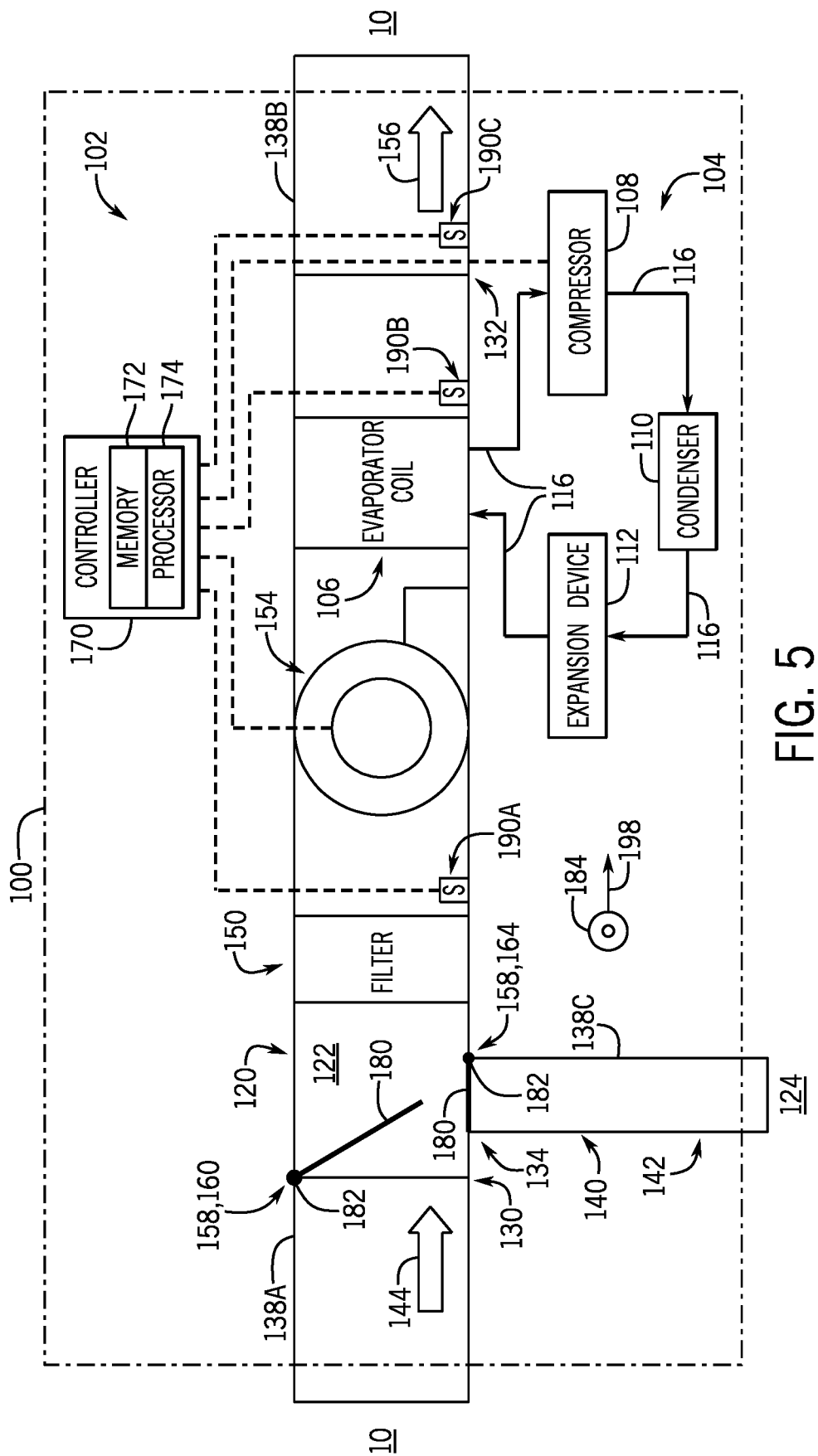
FIG. 5 is a schematic diagram of an embodiment a leak management system of the HVAC system in active detection mode during an ON-cycle of the HVAC system, in accordance with present techniques.

FIG. 5 is a schematic diagram of a HVAC system 100 having a leak management system 102 for detecting and controlling a concentration of leaked refrigerant within the HVAC system 100 and/or a building, such as the building 10 discussed above. As shown, the HVAC system 100 includes a refrigeration circuit 104 having an evaporator coil 106 fluidly coupled with a compressor 108, a condenser 110, and an expansion device 112. A refrigerant 116 flows between HVAC components of the refrigeration circuit 104, undergoing phase changes that enable the HVAC system 100 to condition an interior space of the building 10. The refrigerant 116 may be any suitable refrigerant, such as R32, R1234ze, R1234yf, R-454A, R-454C, R-455A, R-447A, R-452B, R-454B, and the like. Each of the evaporator coil 106, the compressor 108, the condenser 110, and the expansion device 112 may correspond with any corresponding HVAC devices discussed above with reference to FIGS. 1-4. Moreover, the evaporator coil 106, the compressor 108, the condenser 110, and the expansion device 112 may be part of any suitable residential refrigeration system, commercial refrigeration system, split refrigeration system, and/or single unit refrigeration system. As will be discussed in more detail below, the leak management system 102 is capable of detecting a leak of the refrigerant 116 from the refrigeration circuit 104, and performing suitable control actions to mitigate the leak of the refrigerant 116.

Additionally, the illustrated embodiment of the HVAC system 100 in FIG. 5 includes the evaporator coil 106 disposed within an enclosure 120 of the HVAC system 100. The enclosure 120 is generally an air handling enclosure or air handler of the HVAC system 100. Additionally, the enclosure 120 is a structurally strong and/or rigid container or box having walls that fluidly isolate an interior 122 of the enclosure 120 from an exterior 124 of the enclosure 120. In some embodiments, the fluid separation between the interior 122 and the exterior 124 may be air-tight, though in other embodiments, airflow may occur across seams, joints, gaskets, or other features of the enclosure 120. Moreover, in certain embodiments, the enclosure 120 is disposed in an attic, in a supply or utility room, on a roof or wall of a building, or in another suitable location to enable conditioning of the interior space of the building 10.

The disclosed enclosure 120 includes various openings that serve as inlets or outlets for airflow therethrough. For example, as illustrated in FIG. 5, the enclosure 120 includes a return inlet 130 for receiving air from the interior space of the building 10, a supply outlet 132 for directing a conditioned airflow 156 to the interior space of the building 10, and a purge exhaust outlet 134 for directing air out of the enclosure 120. Additionally, a plurality of ducts 138 to direct the air to and from the enclosure 120 include a return inlet duct 138A coupled to the return inlet 130, a supply outlet duct 138B coupled to the supply outlet 132, and a purge exhaust outlet duct 138C coupled to the purge exhaust outlet 134. In general, the ducts 138 are passageways that fluidly connect the interior 122 of the enclosure to various locations inside or outside of the building 10. Further, in certain embodiments, the purge exhaust outlet duct 138C, which corresponds to the purge exhaust outlet 134, includes a proximal portion 140 fluidly coupled to the purge exhaust outlet 134, and a distal portion 142 fluidly coupled to a fresh air source, such as an environment that is external to the building 10 and/or the enclosure 120, or an environment within the building 10 that is unoccupied. For example, if the enclosure 120 is disposed in an attic or utility room of the building, the purge exhaust outlet 134 may be fluidly couple, via the purge exhaust outlet duct 138C, the interior 122 of the enclosure 120 to the outside environment. Additionally, in some embodiments, the purge exhaust outlet duct 138C may be excluded, such that the purge exhaust outlet 136 is an opening into the attic, supply room, or outside environment.

As illustrated in the embodiment of FIG. 5, an unconditioned airflow 144, including air from the interior space of the building 10, is directed into the enclosure 120 along the return inlet duct 138A and the return inlet 130. Additionally, in some embodiments, the unconditioned airflow 144 may include outside air that is mixed with the air from the interior space of the building 10. In the embodiment illustrated in FIG. 5, the unconditioned airflow 144 travels through multiple components within the enclosure 120. For example, the unconditioned airflow 144 travels through a filter 150 that removes particulates, dust, bacteria, or other undesired matter within the unconditioned airflow 144. In certain embodiments, the unconditioned airflow 144 also travels through a heating coil or other suitable components that heat the unconditioned airflow 144 to remove humidity or otherwise condition the unconditioned airflow 144. Further, when actuated, a reversible supply fan 154 disposed within the enclosure 120 receives the unconditioned airflow 144, and moves the unconditioned airflow 144 at an increased speed and/or flowrate through the enclosure 120. When in an ON-cycle, the supply fan 154 operates in the forward direction, such that the supply fan 154 directs the unconditioned airflow 144 to the evaporator coil 106, which cools the unconditioned airflow 144 and/or removes dissolved moisture, such as humidity, from the unconditioned airflow 144 by enabling heat transfer between the refrigerant 116 and the unconditioned airflow 144. The unconditioned airflow 144 is, therefore, conditioned and transformed into the conditioned airflow 156 that travels out of the supply outlet 132 and to the interior space of the building 10 having the HVAC system 100.

In general, the supply fan 154 of the leak management system 102 is capable of being run in reverse, such as by reversing polarity of electrical power provided to the supply fan 154. That is, the supply fan 154 is powered by a reversible motor and, thus, can operate in forward modes and reverse modes, as compared to a unidirectional motor that enables a non-reversible supply fan to only operate in a forward mode. In certain embodiments, the supply fan 154 is powered by a variable speed drive (VSD), such as the VSD 92 discussed above, for variable control of fan speeds in both the forward and reverse modes.

In the embodiment illustrated in FIG. 5, the leak management system 102 includes a controller 170 to control operations therein. Additionally, for the illustrated embodiment, the controller 170 is the HVAC controller that governs operation of the entire HVAC system 100, including the compressor 108, supply fan 154 and more, in addition to the leak management system 102. The controller 170 may include a distributed control system (DCS) or any computer-based workstation. For example, the controller 170 can be any device employing a general purpose or an application-specific processor 174, both of which may generally include memory 172 or suitable memory circuitry for storing instructions and/or data. However, in certain embodiments, the controller 170 may be a separate controller for controlling the leak management system 102 that is communicatively coupled to exchange data and/or instructions with a HVAC controller or another suitable master controller.

The processor 174 illustrated in FIG. 5 may include one or more processing devices, and the memory 172 may include one or more tangible, non-transitory, machine-readable media collectively storing instructions executable by the processor 174 to control the leak management system 102 and/or the HVAC system 100. The processor 174 of the controller 170 provides control signals to operate the leak management system 102 and the HVAC system 100 to perform the control actions disclosed herein. More specifically, as discussed below, the controller 170 receives input signals from various components of the HVAC system 100 and outputs control signals to control and communicate with various components in the HVAC system 100. The controller 170 may provide suitable control signals to control the flowrates, motor speeds, and valve positions, among other parameters, of the HVAC system 100.

Although the controller 170 has been described as having the processor 174 and the memory 172, it should be noted that the controller 170 may include or be communicatively coupled to a number of other computer system components to enable the controller 170 to control the operations of the HVAC system 100 and the related components. For example, the controller 170 may include a communication component that enables the controller 170 to communicate with other computing systems and electronic devices, such as alarm systems. The controller 170 may also include an input/output component that enables the controller 170 to interface with users via a graphical user interface or the like. In addition, the communication between the controller 170 and other components of the HVAC system 100 may be via a wireless connection, such as a connection through Bluetooth® Low Energy, ZigBee®, WiFi®, or may be a wired connection, such as a connection through Ethernet. In some embodiments, the controller 170 may include a laptop, a smartphone, a tablet, a personal computer, a human-machine interface, or the like. Additionally, the embodiments disclosed herein may be at least partially embodied using hardware implementations. For example, logic elements of the controller 170 may include a field-programmable gate array (FPGA), or other specific circuitry.

Moreover, the leak management system 102 includes several components to detect and manage leaks of the refrigerant 116 into the enclosure 120. As shown in the embodiment in FIG. 5, a plurality of airflow management assemblies 158 is disposed within the enclosure 120 to control the flow of air into or from the enclosure 120. As used herein, controlling a respective flow of air is intended to cover blocking or allowing the respective flow of air into our out of respective spaces. Thus, the plurality of airflow management assemblies 158 includes a return inlet assembly 160 and a purge exhaust outlet assembly 164 respectively disposed within the return inlet 130 and the purge exhaust outlet 134. Additionally, each airflow management assembly 158 receives control signals from the controller 170 that instruct each airflow management assembly 158 to move between an open position that enables air to flow through the respective inlet or outlet having the airflow management assembly 158, and a closed position that blocks air from flowing through the respective inlet or outlet having the airflow management assembly 158. Thus, the airflow management assemblies 158 are capable of being controlled to selectively direct air to flow into the enclosure 120, or to enable the air to flow out of the enclosure 120 in a specific manner, as discussed in more detail below. Additionally, closed or open positions of the airflow management assemblies 158 are intended to respectively cover substantially or partially closed positions and substantially or partially open positions.

In some embodiments, as shown in the leak management system 102 of FIG. 5, each airflow management assembly 158 includes a respective damper 180 that pivots circumferentially around a pivot member 182. In some embodiments, the pivot member 182 includes pins that extend along an axis 184 into or out of the page into recesses or openings in the enclosure 120 to provide an axis of rotation of the damper 180. Further, in some embodiments, the airflow management assemblies 158 may include computer-responsive or active elements, such as locking mechanisms or motorized components that operate in response to control signals provided from the controller 170, as discussed in more detail with reference to FIGS. 8 and 9 below. As such, for the illustrated embodiment, in response to pressure or airflows pressing against an unlocked damper 180, the unlocked damper 180 swings open to enable the airflows to pass therethrough.

Additional contemplated embodiments include airflow management assemblies 158 having one or more passive components that operate without instruction from the controller 170. In such embodiments, one or more of the dampers 180 of the airflow management assemblies 158 may be barometric dampers capable of being pushed open when the unconditioned airflow 144 passes or traverses through the dampers 180, and that remain closed when the unconditioned airflow 144 is not present, such as when the supply fan 154 is not active. Additionally, in some embodiments, one or more of the dampers 180 may be self-closing and/or reverse spring-loaded to facilitate the closing of the dampers 180. Moreover, in further embodiments, a portion of the airflow management assemblies 158 are actively controlled, computer-responsive elements, and another portion of the airflow management assemblies 158 are passively or indirectly controlled by the controller 170 via control of the supply fan 154. For example, the return inlet assembly 160 may be actively controlled in some embodiments, while the purge exhaust outlet assembly 164 is passively controlled. Additionally, in some embodiments, an airflow management assembly 158 is also included in the supply outlet 132, such that the enclosure 120 may be fluidly sealed or isolated during OFF-cycle of the HVAC system 100, such as to concentrate any leaking refrigerant in the enclosure 120 for detection.

The leak management system 102 may operate in active detection mode during both the ON-cycle and the OFF-cycle of the HVAC system 100. To detect leaks in active detection mode, the embodiment of the leak management system 102 illustrated in FIG. 5 includes a plurality of concentration sensors 190. For example, as shown, a first concentration sensor 190A is disposed within the enclosure 120 near or proximate the supply fan 154, a second concentration sensor 190B is disposed within the enclosure 120 near or proximate the evaporator coil 106, and a third concentration sensor 190C is disposed within the supply outlet duct 138B. Additionally, as used herein, a respective concentration sensor 190 is "proximate" or near another element when the respective concentration sensor 190 is capable of measuring a concentration of the refrigerant 116 within sensing range of the evaporator coil 106, disposed within a threshold distance of the element and/or adjacent to the element.

The concentration sensors 190 are communicatively coupled to the controller 170 to transmit sensor signals to the controller 170 indicative of a concentration of the refrigerant 116 that has leaked into the interior 122 of the enclosure 120 or within the supply outlet duct 138B. Additional embodiments include additional concentration sensors 190 positioned within the interior space of the building 10, such as within ductwork 14 illustrated in FIG. 1, to detect the concentration of the refrigerant 116 within the interior space of the building 10 as well. However, as discussed herein, the concentration sensors 190 are generally disposed proximate the enclosure 120 to enable the concentration sensors 190 to monitor potential leaks of the refrigerant 116 from the evaporator coil 106 or other components of the refrigeration circuit 104. As used herein, "proximate" with respect to components of the HVAC system 100 indicates being inside of, adjacent to, proximate to, and/or within inches or feet of the components of the HVAC system 100, while "proximate" with respect to the HVAC system 100 indicates being proximate or within the HVAC system 100.

As illustrated in the embodiment of FIG. 5, the first concentration sensor 190A is disposed upstream of the supply fan 154 relative to a forward airflow direction 198 through the enclosure 120 when conditioning air. As will be discussed with reference to FIG. 7 below, the first concentration sensor 190A may thus enable detection of the concentration of the refrigerant 116 traversing the supply fan 154 when the supply fan 154 is operating in reverse. Additionally, as illustrated, the second concentration sensor 190B is downstream of the evaporator coil 106 relative to the forward airflow direction 198 through the enclosure 120 to enable detection of the concentration of the refrigerant 116 during forward operation of the supply fan 154. In other embodiments, the second concentration sensor 190B is disposed upstream of the evaporator coil 106 or in another location suitable for sensing the concentration of the refrigerant 116, such as below the evaporator coil 106. When disposed proximate the evaporator coil 106, it is presently recognized that the second concentration sensor 190B is closer to a greater quantity of braze joints, solder joints, or other potential leaks of the refrigerant 116 from the evaporator coil 106, thus enhancing detection of the refrigerant leaks. Additionally, although three concentration sensors 190 are discussed herein, any suitable number of concentration sensors 190 may be included proximate the evaporator coil 106, the enclosure 120, the ducts 138, and/or the interior space of the building 10. For example, in certain embodiments having multiple concentration sensors 190 proximate the HVAC system 100, the controller 170 is capable of triangulating, locating, or pinpointing a position of a refrigerant leak via the signals received from the multiple concentration sensors 190.

The concentration sensors 190 may be any suitable type of concentration sensors, including electrochemical gas detectors, catalytic bead sensors, photoionization detectors, infrared point sensors, infrared imaging sensors, semiconductor sensors, ultrasonic gas detectors, holographic gas sensors, or any other suitable concentration sensor capable of detecting a concentration of the refrigerant 116. Moreover, although discussed herein as having concentration sensors 190, the leak management system 102 may, additionally or alternatively, include other sensors suitable for detecting a presence of the refrigerant 116 within the enclosure 120, such as temperature sensors, pressure sensors, acoustic sensors, flowrate sensors, etc. Accordingly, with the above understanding of the components of the leak management system 102, the example embodiment of the leak management system 102 operating in active detection mode during ON-cycle of the HVAC system 100 (FIG. 5), in active detection mode during OFF-cycle of the HVAC system 100 (FIG. 6), and in leak response mode (FIG. 7) discussed below may be more readily understood.

In general, the HVAC system 100 is capable of switching between an ON-cycle in which the compressor 108 draws or drives the refrigerant 116 within the refrigeration circuit 104 to condition the interior space, and an OFF-cycle in which the compressor 108 does not motivate the refrigerant 116 through the refrigeration circuit 104. Additionally, the leak management system 102 is capable of switching between various operating modes, such as an active detection mode and leak response mode, to enable detection and mitigation of refrigerant leaks. The embodiment of the HVAC system 100 illustrated in FIG. 5 is in an ON-cycle that conditions the interior space of the building. For the illustrated embodiment, when the HVAC system 100 is in the ON-cycle, the leak management system 102 is in the active detection mode, and thus the controller 170 instructs the return inlet assembly 160 to enable the unconditioned airflow 144 to flow therethrough. The controller 170 also instructs the purge exhaust outlet assembly 164 to close or remain closed, such that the unconditioned airflow 144 is not capable of passing therethrough. Additionally, the controller 170 activates the compressor 108, which cycles the refrigerant 116 to condition the unconditioned airflow 144. Additionally, the HVAC system 100 drives the supply fan 154 in forward operation, which provides the unconditioned airflow 144 from the interior space of the building 10, within the enclosure 120, across the concentration sensors 190, and back to the interior space of the building 10.

Thus, in active detection mode, the controller 170 of the illustrated leak management system 102 measures the refrigerant concentration by receiving the signals from the concentration sensors 190 indicative of the concentration of the refrigerant 116 that may have leaked from the refrigeration circuit 104 and into the enclosure 120 or the ducts 138. Then, based on the signals, the controller 170 determines the concentration of the refrigerant 116. Additionally, in some embodiments, the concentration sensors 190 provide binary signals indicative of whether a threshold amount of the refrigerant 116 is detected or is not detected. For example, during operation of the HVAC system 100, a leak of the refrigerant 116 may not be present. Thus, if no leak of the refrigerant 116 is present, the controller 170 may determine that the concentration of the refrigerant 116 is below a lower detection limit of the concentration sensors 190. However, when refrigerant 116 leaks from the evaporator coil 106 and is sensed by the concentration sensors 190, the controller 170 receives the signals and determines a non-zero concentration of the refrigerant 116 within the enclosure 120 or the ducts 138.

Additionally, the controller 170 compares the concentration of the refrigerant 116 to a predefined concentration threshold. The predefined concentration threshold may be a user-set, technician-set, or distributor-set value that is stored within the memory 172 of controller 170, either before or after the controller 170 is placed into operation within the HVAC system 100. In some embodiments, the predefined concentration threshold may be set as the lower detection limit of the concentration sensors 190. In response to determining that the concentration of the refrigerant 116 is less than the predefined concentration threshold, the controller 170 continues to operate the leak management system 102 in the active detection mode to continue to determine the concentration of the refrigerant 116. In some embodiments, the controller 170 and the concentration sensors 190 may also wait a predefined time threshold before determining the concentration of the refrigerant 116 again, thus enhancing a useable life of the concentration sensors 190 and/or reducing usage of computing power of the controller 170. In certain embodiments, the predefined time threshold is set as 1 minute, 5 minutes, 10 minutes, 60 minutes, or more.

In response to determining that the concentration of the refrigerant 116 is greater than the predefined concentration threshold, the controller 170 determines that a leak of the refrigerant 116 is present within the enclosure 120 or the ducts. Thus, to perform suitable control actions for managing the detected leak of the refrigerant 116, the leak management system 102 enters the leak response mode, in which the supply fan 154 is operated in reverse to purge air out of the interior space of the building 10 and out of the purge exhaust outlet 134, as discussed in detail with reference to FIG. 7 below.

Figure 6:
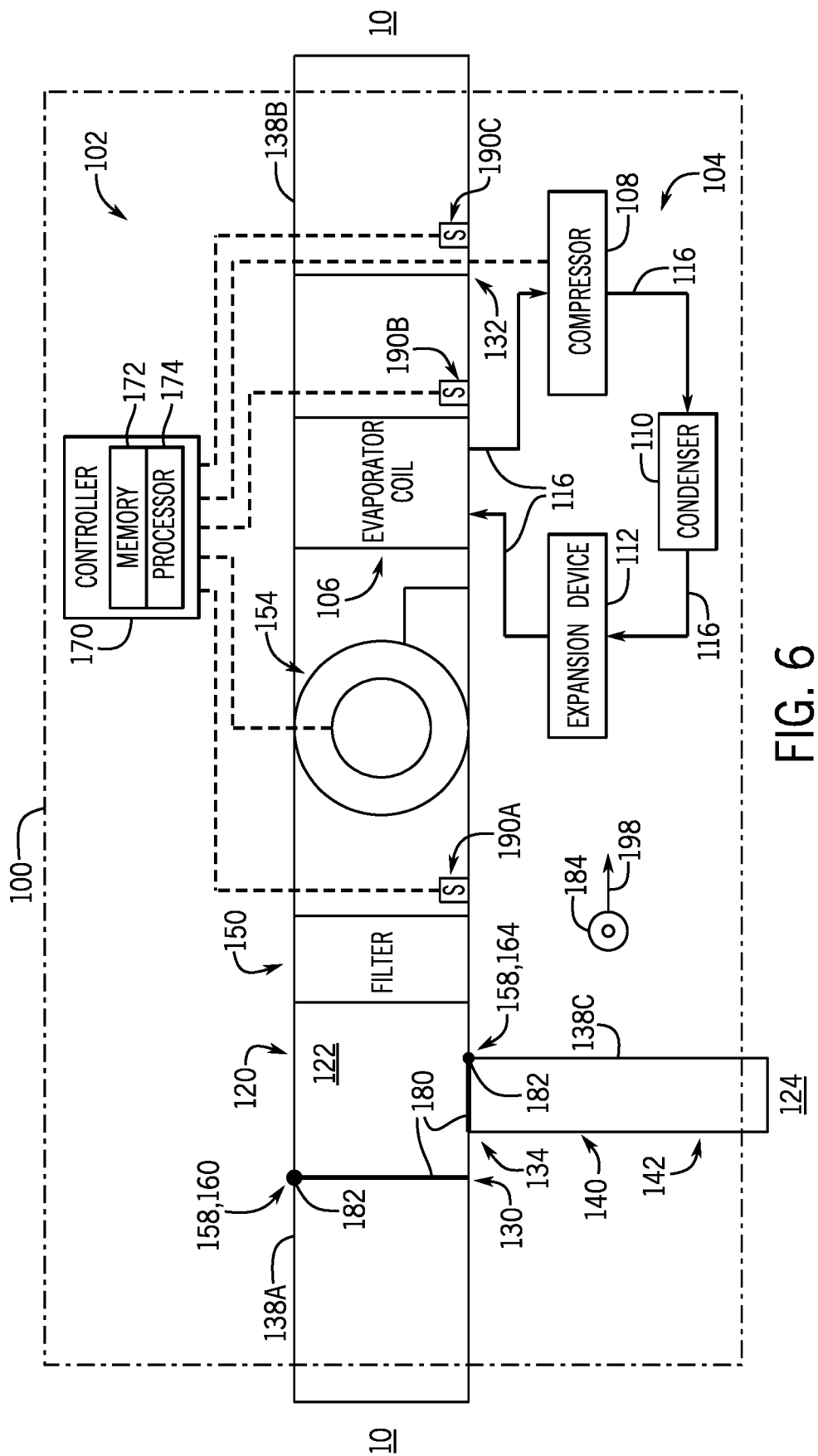
FIG. 6 is a schematic diagram of the embodiment of the leak management system of FIG. 5 in leak response mode during an OFF-cycle of the HVAC system, in accordance with present techniques.

FIG. 6 is a schematic diagram of the leak management system 102 of FIG. 5, in which the HVAC system 100 is in OFF-cycle. The illustrated embodiment of the leak management system 102 is in the active detection mode for detecting a concentration of the refrigerant 116 that may leak from the refrigeration circuit 104 under certain conditions. As discussed previously, the HVAC system 100 is in the OFF-cycle whenever the compressor 108 is not active. Further, when the HVAC system 100 is in the OFF-cycle, and when a fan-only or ventilation function of the HVAC system 100 is not requested, the controller 170 may instruct the supply fan 154 to deactivate. Thus, without the force of the supply fan 154 to draw the unconditioned airflow 144 through the return inlet assembly 160 or to push an airflow through the purge exhaust outlet assembly 164, the illustrated airflow management assemblies 158 remain in the closed position. In this manner, a leak of the refrigerant 116 within the enclosure 120 or within the ducts 138 may be confined within the HVAC system 100. Accordingly, the controller 170 operates the leak management system 102 in active detection mode to monitor a concentration of the refrigerant 116 during OFF-cycles of the HVAC system 100, in addition to the ON-cycle discussed above. However, in other embodiments of the airflow management assemblies 158 without computer-responsive components, one or more of the dampers 180 may be self-closing dampers that automatically rotate via gravity, springs, etc., back to the closed position when an airflow is not present.

Further, in certain embodiments, the controller 170 may receive the signals from the concentration sensors 190 indicative of the respective concentration of the refrigerant 116 proximate each concentration sensor 190, and then determine a location of the refrigerant leak based on the relative concentrations proximate each concentration sensor 190. For example, in certain conditions, the controller 170 determines that because the first concentration sensor 190A senses a greater concentration of the refrigerant 116 than the second concentration sensor 190B, the location of the leak of the refrigerant 116 is closer to the first concentration sensor 190A than the second concentration sensor 190B. By determining the location of the leak during the OFF-cycle of the HVAC system, the controller 170 may provide the information to users for repairing the leak for effectively.

Then, after determining that the concentration of the refrigerant 116 is above the predefined concentration threshold, the controller 170 operates the leak management system 102 in the leak response mode.

Figure 7:
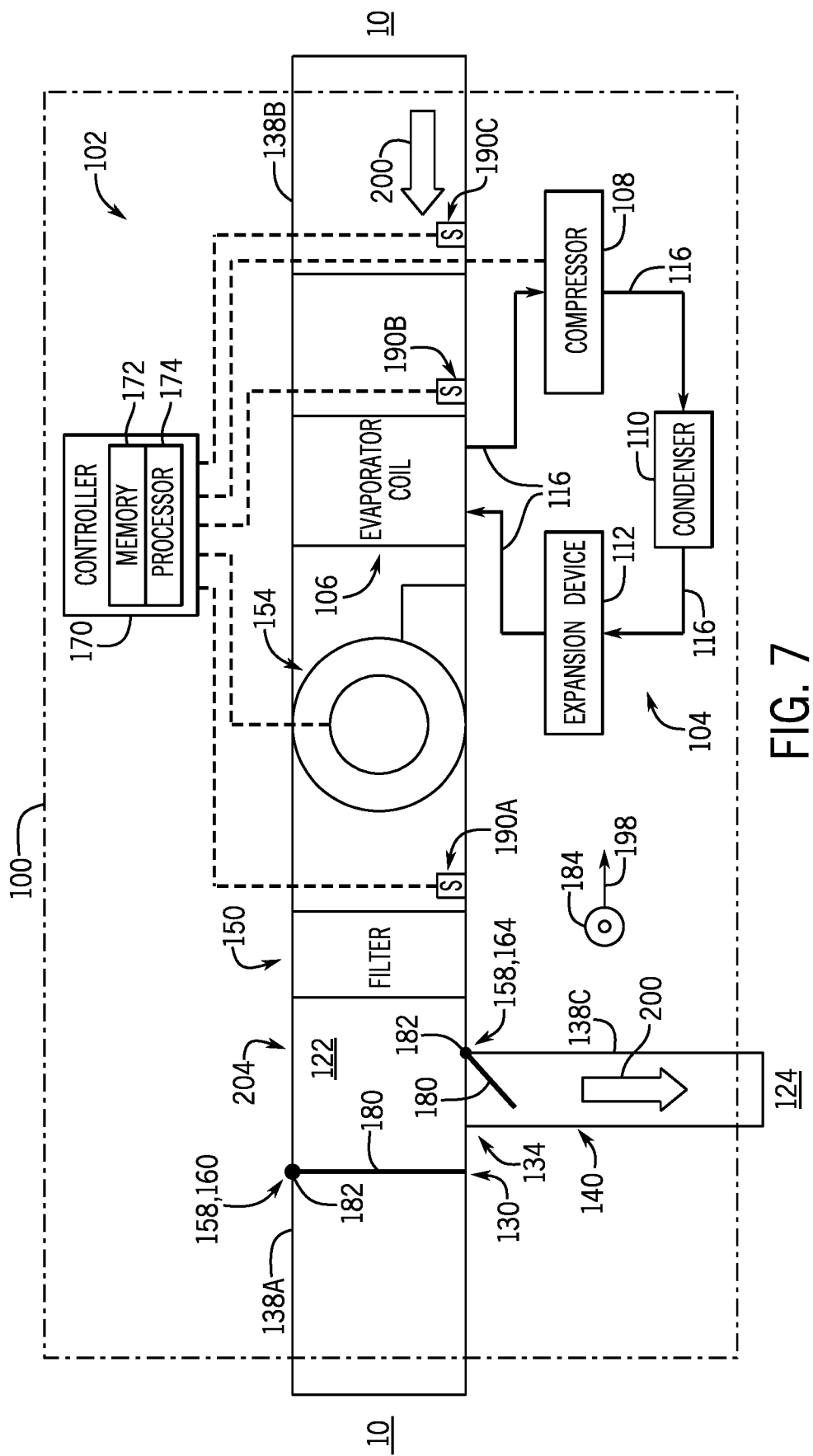
FIG. 7 is a schematic diagram of the embodiment of the leak management system of FIG. 5 in leak response mode, in accordance with present techniques.

For example, FIG. 7 is a schematic diagram of the embodiment of the HVAC system 100 with the leak management system 102 in leak response mode. In leak response mode, the controller 170 provides control signals or requests to a master controller modifying operation of the HVAC system 100. In some embodiments, the control signals prompt the HVAC system 100 to provide alerts and/or mitigating actions for a detected refrigerant leak identified via the concentration of the refrigerant 116 exceeding the predefined concentration threshold. For example, the controller 170 may transmit the control signal to instruct a device, such as a thermostat, a user device, and/or a service technician workstation, to generate an alert indicative of the detected refrigerant leak. In some embodiments, the alert also includes instructions to deactivate activation sources and/or to instruct users to respond appropriately. Once informed of the detected refrigerant leak, users may perform manual control actions, such as shutting off the HVAC system 100 or repairing a portion of the evaporator coil 106, in response to the detected refrigerant leak.

Additionally or alternatively, the control signals from the controller 170 may modify operation of the HVAC system 100 to mitigate the detected refrigerant leak. For example, in certain conditions, the controller 170 provides control signals that instruct the airflow management assemblies 158 of the leak management system 102 to move to a leak response orientation or closed configuration corresponding to the leak response mode, and then operate the supply fan 154 in reverse to purge air from the interior space of the building 10, as illustrated in FIG. 7. More particularly, as shown in the embodiment of the leak management system 102 in the leak response orientation, the return inlet 130 is closed via the return inlet assembly 160, and the purge exhaust outlet 134 is open relative to the purge exhaust outlet assembly 164. To realize these positions, for the illustrated embodiment, the controller 170 instructs locking mechanisms of the return inlet assembly 160 to actuate to a locked position, thus blocking the corresponding damper 180 from rotating to an open position in response to an airflow when the supply fan 154 is activated in reverse to purge or vent the building 10. Additionally, when in the leak response orientation corresponding to the leak response mode, the controller instructs the locking mechanisms of the purge exhaust outlet assembly 164 to actuate to an unlocked position that enables the corresponding damper 180 to rotate in response to the airflow from the supply fan 154.

Further, as illustrated in FIG. 7, the controller 170 activates the supply fan 154 in reverse by reversing a polarity of a power source supplied to the supply fan 154 to draw a purge airflow 200 from the interior space of the building 10, into the supply outlet 132 of the enclosure 120, and out of the open purge exhaust outlet 134. This leak response orientation of the airflow management assemblies 158 fluidly couples the interior 122 of the enclosure 120 to an environment outside of the enclosure 120 and/or the building via the purge exhaust outlet 134 and corresponding purge exhaust outlet duct 138C, while fluidly blocking the purge airflow 200 from traveling from the interior 122 of the enclosure 120 to the interior space of the building 10 via the locked return inlet assembly 160 at the return inlet 130. Indeed, by forming the purge exhaust outlet 134 in an upstream portion 204 of the enclosure 120 relative to the supply fan 154, the leak management system 102 enables the purge airflow 200 to be provided through the purge exhaust outlet 134 by the supply fan 154 operating in reverse. Additionally, in some embodiments, the controller 170 instructs the supply fan 154 to move the purge airflow 200 from the interior space of the building 10 until all or a portion of the air from the building 10 is replaced. The controller 170 is capable of determining the portion or percentage of the air that is removed, purged, or replaced from the building 10 based on a predetermined volume of the building, as well as a volumetric flowrate of the purge airflow 200 and the amount of time for which the volumetric flowrate has been produced. Thus, in some embodiments, the controller 170 instructs the supply fan 154 to purge at least a threshold quantity of air from the interior space of the building 10.

In certain embodiments, as the purge airflow 200 is moved out of the enclosure 120, one or more replacement airflows are drawn into the interior space of the building 10. Generally, the replacement airflow does not include leaked refrigerant 116, such that the replacement airflows provided into the interior space of the building 10 dilute any concentration of the refrigerant 116 leaked into the enclosure 120. The replacement airflow may be provided into the interior space of the building 10 via any suitable airflow path, such as one or more gaps between walls, windows, or other spaces or sealing defects of the building 10. Additionally, in certain embodiments, the leak management system 102 includes a purge inlet that fluidly couples the interior space of the building 10 to a fresh air source. In such embodiments, the fresh air source may be located on an opposed or different portion of the building 10 as the distal portion 142 of the purge exhaust outlet duct 138C, such that fresh air is drawn into the building 10 to replace the purge airflow 200. The purge inlet may thus include a purge inlet assembly, such as a controller-actuated window, vent, or roof hatch that is moveable to an open position upon instruction by the controller 170 in the leak response mode. As such, embodiments having the purge exhaust inlet may enable faster replacement of the air within the building 10, while maintaining the structural security of the building 10. Indeed, a negative pressure caused by the operation of the supply fan 154 may draw the replacement airflow from various air sources that are fluidly coupled to the enclosure 120, such as gaps or imperfect seals between the building 10 and the external environment 124.

Thus, when in the active detection mode, the leak management system 102 operates the supply fan 154 in reverse to remove the leak of the refrigerant 116 from the interior space of the building 10, and to purge the leaked refrigerant from the purge exhaust outlet 134 to the external environment 124. By this technique, the leak management system 102 reduces, eliminates, or prevents spreading of the leak of the refrigerant 116 throughout the building 10. Additionally, the control signals provided by the controller 170 in leak response mode are capable of operating the leak management system 102 to dilute, remove, or mitigate refrigerant 116 sourced from the detected refrigerant leak until the detected refrigerant leak is resolved. Moreover, one or more of the above modifications to the HVAC system 100 may be performed simultaneously, or within a time threshold relative to one another, to more rapidly respond to the detected refrigerant leak. Additionally, in some embodiments, the controller 170 may prevent or block the HVAC system 100 from operating until after the concentration of the refrigerant is again within the predefined concentration threshold, or until after the detected refrigerant leak is repaired. In some embodiments, the controller 170 determines the detected refrigerant leak is repaired based on user input received from a user device indicative of a completed repair. As such, the embodiments of the HVAC system 100 that include the disclosed leak management system 102 are able to purge the leaked refrigerant from the interior space of the building 10.

In some embodiments, the controller 170 may employ a feedback loop to dynamically adjust the modifications to the HVAC system 100 and leak management system 102 in leak response mode. That is, the controller 170 may implement a dynamic response strategy that monitors the concentration of the refrigerant 116 after the refrigerant leak is detected to evaluate an effectiveness of the modifications to the HVAC system 100. Thus, the controller 170 further modifies and/or adjusts operation of the HVAC system 100 and the leak management system 102 based on the determined effectiveness of the corrective actions taken. For example, under certain conditions, after determining that the concentration of the refrigerant 116 proximate the enclosure 120 remains above the predefined concentration threshold, the controller 170 instructs the supply fan 154 to increase a fan speed of the supply fan 154 that is operating in reverse. For example, the fan speed may be increased by increasing a voltage or current applied to the supply fan 154. Then, the controller 170 receives signals indicative of the concentration of the refrigerant 116 from one or more of the concentration sensors 190. In some embodiments, the signals are received continuously, at regular intervals, every minute, every 10 minutes, or the like. Based on the received signals, the controller 170 continues to determine the concentration of the refrigerant 116. If the controller 170 determines that the concentration of the refrigerant 116 has dropped or is dropping below the predefined concentration threshold, the controller 170 may instruct the supply fan 154 to maintain the current fan speed or return to a normal operating fan speed.

However, if the controller 170 determines that the concentration of the refrigerant 116 is not diminishing, such as remaining above the predefined concentration threshold or continuing to increase after a predetermined amount of time, the controller 170 may instruct the supply fan 154 to further increase the fan speed thereof, moving more air and leaked refrigerant 116 as the purge airflow 200 from the building 10, through the enclosure 120 and out through the purge exhaust outlet 134. The dynamic response strategy may be implemented across any range of fan speeds that the supply fan 154 operating in reverse may produce. Thus, the controller 170 controls the leak management system 102 to both detect and mitigate detected refrigerant leaks from the HVAC system 100 to block or prevent the refrigerant 116 from reaching the predefined concentration threshold within the interior space of the building 10.

In further embodiments, the leak management system 102 includes an additional verification sensor disposed within the enclosure 120 or within any suitable duct 138 to detect whether the leak management system 102 is purging the detected refrigerant leak from the building. For example, in certain embodiments, the verification sensor is a flowrate sensor capable of measuring a flowrate produced by the supply fan 154 through the purge exhaust outlet 134 and/or the purge exhaust outlet duct 138C. Thus, the flowrate sensor provides feedback to the controller 170 indicative of the flowrate produced by the supply fan 154. The controller 170 compares the flowrate produced by the supply fan 154 to a target flowrate set for the supply fan 154 to determine whether the actual flowrate is within a threshold of the target flowrate. If the actual flowrate is outside of the threshold, the controller 170 may perform a suitable control action, such as providing control signals that generate and provide alerts indicative of the actual flow rate of the supply fan 154 being outside of the threshold from the target flowrate, increasing other control actions, shutting down the leak management system 102, or any other suitable control action. Moreover, any other suitable parameter may be monitored and controlled based on input from other suitable verification sensors, such as a pressure sensor, a temperature sensor, etc.

Additionally, in certain embodiments, existing HVAC systems 100 may be retroactively fitted with the leak management systems 102 discussed herein. In such embodiments, the enclosure 120 may be modified by forming one or more new openings to include the purge exhaust outlet 134. A purge exhaust outlet duct 138C may be coupled to the purge exhaust outlet 134. Further, the return inlet assembly 160 and purge exhaust outlet assembly 164 and the purge inlet assembly 222 may be disposed respectively at the return inlet 130 and the purge exhaust outlet 134. Thus, the leak management systems 102, or any other suitable embodiments of leak management systems discussed herein may be added to existing enclosures of HVAC systems to enable refrigerant leak detection and mitigation.

Figure 8:
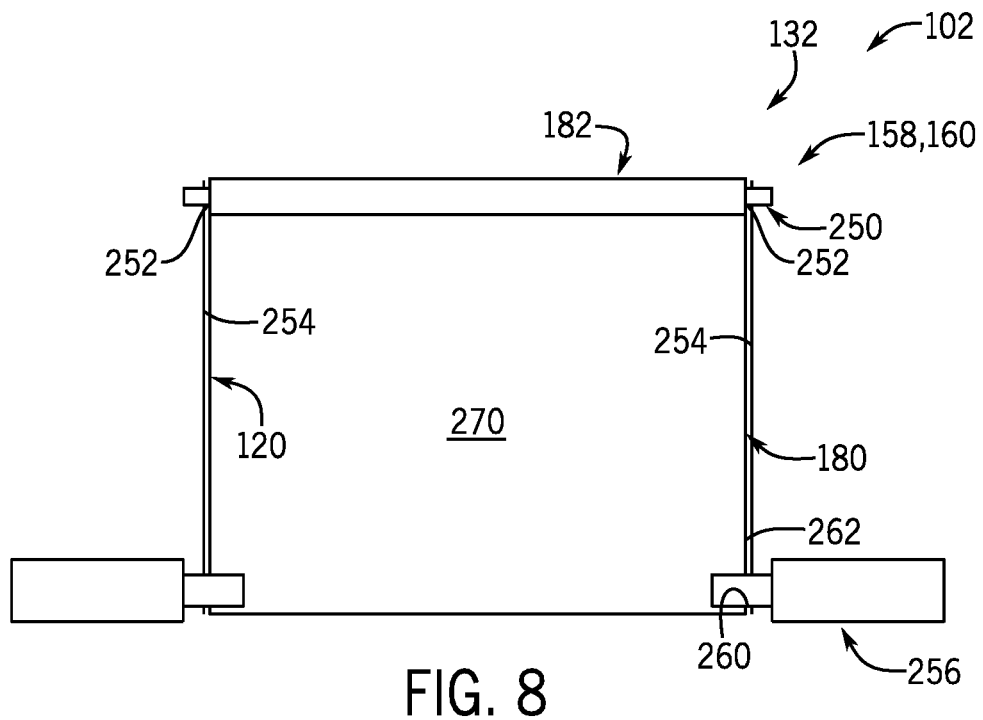
FIG. 8 is a front perspective view of an embodiment of a return inlet assembly of the leak management system having locking mechanisms, in accordance with present techniques.

FIG. 8 is a front perspective view of an embodiment of the return inlet assembly 160 of the leak management system 102. As illustrated, the return inlet assembly 160 is one of the airflow management assemblies 158 disposed within or at the inlets and outlets of the enclosure 120. To fluidly isolate the interior 122 of the enclosure 120 from the return inlet duct 138A fluidly coupled to the return inlet 130, the return inlet assembly 160 includes the damper 180 rigidly coupled to the pivot member 182. The damper 180 may be a flexible or semi-flexible panel that is attached to, or integrally formed with, the pivot member 182 by any suitable means. Additionally, the pivot member 182 is a cylindrical or tubular member having pivot pins 250 extending therefrom to enable the damper 180 to pivot around a circumferential axis of the pivot pins 250 in response to an airflow. As shown in the present embodiment of the return inlet assembly 160, the pivot pins 250 are disposed through openings 252 in walls 254 of the enclosure 120. However, in other embodiments, the pivot pins 250 may alternatively be held in corresponding recesses, or may be replaced by other suitable components for enabling pivoting relative to the enclosure 120.

Additionally, the leak management system 102 includes one or more locking mechanisms 256 discussed above. For example, as seen in the embodiment of FIG. 8, two locking mechanisms 256 each include shafts 260 that extend through corresponding openings 262 or lower openings in the walls 254 of the enclosure 120. The locking mechanisms 256 are linear actuators that are electrically actuated via signals from the controller 170. However, other suitable locking mechanisms, such as hydraulically actuated linear actuators may also be used in the techniques disclosed herein. The shafts 260 are extended within the return inlet duct 138A adjacent or directly adjacent to the return inlet 130, and thus lock the damper 180 in the closed position. In conditions in which the controller 170 is not actuating the locking mechanisms 256, the shafts 260 are retracted at least partially within the corresponding openings 262, such that the damper 180 is free to rotate in response to an airflow pushing on an exterior surface of the damper 180 opposite of a presently visible, interior surface 270 of the damper 180. Locking mechanisms 256 may also be included within the leak management system 102 to enable control of the purge exhaust outlet assembly 164 as well. In other embodiments, other types of airflow management mechanisms and/or locking mechanisms may be used, in accordance with the present disclosure.

Figure 9:
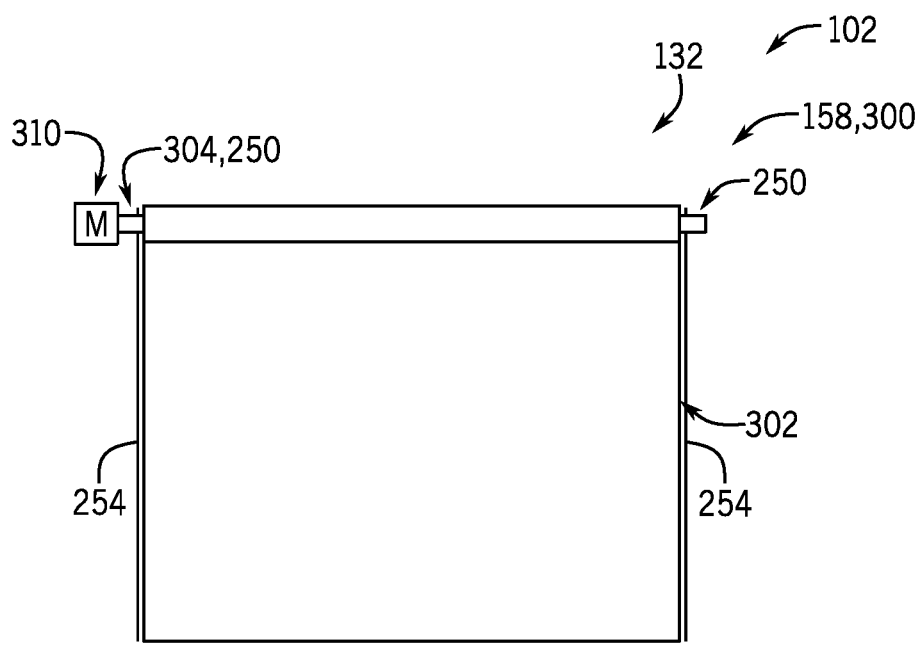
FIG. 9 is a front perspective view of an embodiment of a return inlet assembly of the leak management system having a motorized damper, in accordance with present techniques.

For example, FIG. 9 is a front perspective view of an embodiment of a return inlet assembly 300 of the leak management system 102. As illustrated, the return inlet assembly 300 includes similar components to the return inlet assembly 160 of FIG. 8. For example, the return inlet assembly 300 also includes the pivot member 182 having the pivot pins 250 extending through the openings 252 in the walls 254 of the enclosure 120. However, the present embodiment of FIG. 9 also includes a rigid damper 302 coupled to or integrally formed with the pivot member 182. The illustrated rigid damper 302 is formed from a stiff sheet, such as a sheet made of structurally supported rubber, from metal, etc. Additionally, a proximal pivot pin 304 of the pivot pins 250 is coupled to a drive mechanism, such as an illustrated motor assembly 310. Upon instruction by the controller 170, the motor assembly 310 drives the rigid damper 302 to rotate via applying torque to the proximal pivot pin 304. In this manner, the motor assembly 310 may move the return inlet assembly 300 to any suitable open, partially open, or closed position to enable the leak management system 102 to alternatively condition the interior space of the building 10, or purge the air and leaked refrigerant within the building 10 out through the purge exhaust outlet 134. A motor assembly 310 may also be used to actively control the position of the purge exhaust outlet assembly 164 as well. In certain embodiments, employing the motor assembly 310 in place of the locking mechanisms 256 reduces a number of components, a number of openings or recesses in the enclosure walls, and/or an installation time for the HVAC system 100.

Figure 10:
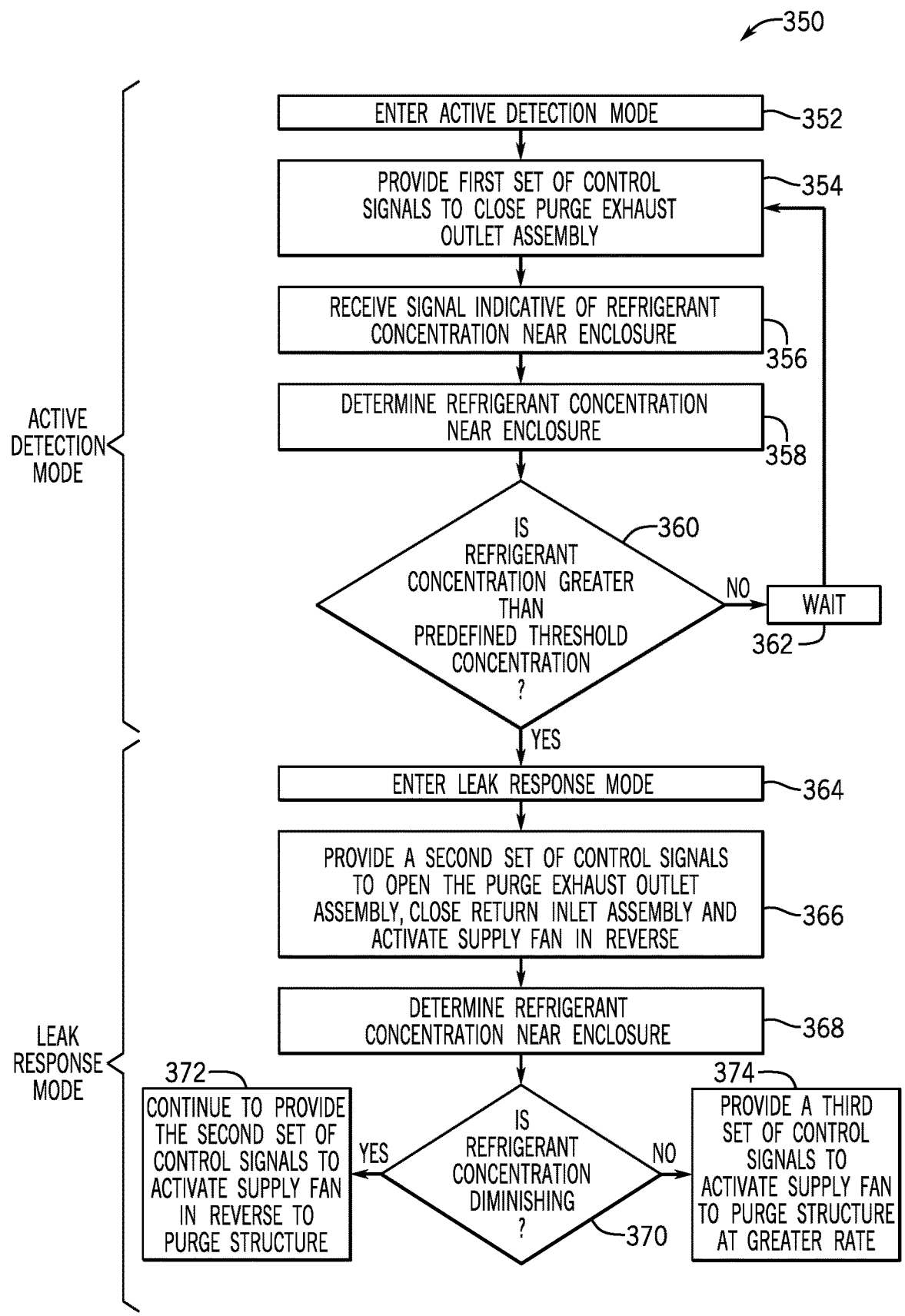
FIG. 10 is a flow diagram representing an embodiment of a process of operating the leak management system of FIG. 5, in accordance with present techniques.

FIG. 10 is a flow diagram illustrating an embodiment of a process 350 for operating the leak management system 102 of FIG. 5. It is to be understood that the steps discussed herein are merely exemplary, and certain steps may be omitted or performed in a different order that the order discussed herein. The process 350 may be performed by the controller 170 via one or more processors, such as the processor 174 of the controller 170, an additional processor, or a combination thereof. First, as indicated in block 352, the illustrated process 350 includes the controller 170 entering active detection mode. As discussed above, the controller 170 operates in active detection mode during both ON-cycle and OFF-cycle of the HVAC system 100. However, in some embodiments, the controller 170 may additionally switch to operate in an idle mode that does not actively monitor the concentration of the refrigerant 116 during ON-cycles of the HVAC system 100, upon user request, or during any other suitable times when detecting the concentration of the refrigerant 116 is not performed.

Continuing along the illustrated process 350, the controller 170 provides a first set of control signals to close the purge exhaust outlet assembly 164, as indicated in block 354. As discussed above with respect to FIG. 5, in active detection mode, the controller 170 maintains the purge exhaust outlet assembly 164 in the closed position, such that the unconditioned airflow 144 may travel through the enclosure 120 to be conditioned without the supply fan 154 drawing in outside air through the purge exhaust outlet 134. In certain embodiments, the purge exhaust outlet assembly 164 remains in the closed position from startup or installation of the HVAC system 100 until a refrigerant leak is detected, such that the first set of control signals are not provided. To enable the conditioning of the unconditioned airflow 144 during ON-cycle of the HVAC system 100, the controller 170 allows the return inlet assembly 160 to remain open. Then, the controller 170 receives a signal indicative of a concentration of the refrigerant 116 proximate the enclosure 120, as indicated in block 356. The one or more concentration sensors 190 disposed proximate the enclosure 120 may transmit the signal indicative of the concentration of the refrigerant 116 to the controller 170. Indeed, the concentration sensors 190 may transmit the signal continuously, at regular intervals, or after detecting a change in the concentration of the refrigerant 116 proximate the enclosure 120, such as within the enclosure 120 and/or within the ducts 138.

Additionally, the controller 170 determines the concentration of the refrigerant 116 proximate the enclosure 120, as indicated in block 358. As discussed above, the controller 170 determines or monitors the concentration of the refrigerant 116 based on the signal from the concentration sensors 190. In embodiments having multiple concentration sensors 190, the controller 170 is capable of determining the concentration of the refrigerant 116 proximate each concentration sensor 190. The illustrated process 350 also includes the controller 170 determining whether the concentration of the refrigerant 116 is greater than the predefined concentration threshold, as indicated in block 360. For example, the predefined concentration threshold may be a parameter stored within the memory 172 of the controller 170, as discussed above. In response to determining, as indicated in block 360, that the concentration of the refrigerant 116 is less than the predefined concentration threshold, the controller 170 waits, as indicated in block 362, a predefined amount of time before returning to block 354 to continue providing the first set of control signals to maintain the purge exhaust outlet assembly 164 in the closed position. Then, the controller 170 may continue to enable the return inlet assembly 160 to move between open and closed positions that correspond to the current cycle of the HVAC system 100, and continue receiving, as indicated in block 356, the one or more signals indicative of the concentration of the refrigerant 116. By waiting before continuing to determine the concentration of the refrigerant 116, the process 350 extends a usable life of the concentration sensors 190, as compared to embodiments in which the concentration sensors 190 are operating continuously.

In response to determining, as indicted in block 360, that the concentration of the refrigerant 116 is greater than the predefined concentration threshold, the controller 170 enters leak response mode, as indicated in block 364. That is, the controller 170 generally provides control signals to operate the leak management system 102 in leak response mode to mitigate a detected refrigerant leak. As illustrated by the present embodiment of the process 350, the controller 170 operates in leak response mode by selectively actuating the airflow management assemblies 158 to enable a refrigerant laden airflow to be removed from the interior space of the building 10. More particularly, in leak response mode, the controller 170 provides, as indicated in block 366, a second set of control signals to open the purge exhaust outlet assembly 164, to close the return inlet assembly 160, and to actuate the supply fan 154 in reverse. In the present embodiment, the control signals provided by the controller 170 instruct the purge exhaust outlet assembly 164 to open by instructing the corresponding locking mechanisms 256 to unlock the dampers 180, such that an airflow can open the unlocked damper 180 at the purge exhaust outlet 134. Additionally, when the supply fan 154 is actuated in reverse, the supply fan 154 moves a refrigerant-containing airflow out of the unlocked purge exhaust outlet assembly 164 to purge the building 10 of the leaked refrigerant 116. Additionally, a replacement airflow is drawn into the building 10 and mixes with the air and/or leaked refrigerant within the building 10, thus lowering the concentration of the refrigerant 116 in the building 10.

To perform dynamic feedback control in leak response mode, after a threshold amount of time, the controller 170 determines the concentration of refrigerant 116 again, as indicated in block 368. Then, the controller 170 determines whether the concentration of the refrigerant 116 is diminishing, as indicated in block 370. For example, the concentration of the refrigerant 116 may be diminishing when the concentration of the refrigerant 116 is decreasing from the initial detected concentration, decreasing below the predefined concentration threshold, and/or has a rate of change greater than a rate of change threshold. In response to determining, as indicated in block 370, that the concentration of the refrigerant is diminishing, the controller 170 continues to provide the second set of control signals to the airflow management alert assemblies 158 and the supply fan 154 to purge the building 10, as indicated in block 372. In response to determining that the concentration of the refrigerant is not diminishing, the controller 170 provides a third set of control signals to instruct the supply fan 154 to increase a speed of the supply fan 154 operating in reverse, thus increasing, as indicated in block 374, a rate at which the leaked refrigerant is purged from the building 10.

Additionally, the control signals from the controller 170 in leak response mode may cause the components of the HVAC system 100 to perform any suitable control actions, such as transmitting an alert indicative of the concentration of the refrigerant 116 to a user or to a service technician and/or ceasing operation of the HVAC system 100. In general, a concentration of the refrigerant 116 that exceeds the predefined concentration threshold is indicative of a leak of the refrigerant 116. Thus, in certain embodiments, the control signals from the controller 170 instigate control actions which inform users or service technicians of the leak of the refrigerant 116 and/or control actions that mitigate the leak of the refrigerant.

Accordingly, the present disclosure is directed to a leak management system for detecting and mitigating leaks of a refrigerant within a building having a HVAC system. The leak management system includes a plurality of airflow management assemblies capable of fluidly isolating an interior of the enclosure from ducts fluidly coupled to the enclosure. The leak management system also includes one or more concentration sensors that transmit signals indicative of the concentration of the refrigerant proximate the enclosure to a controller. The controller monitors the concentration of the refrigerant in coordination with the operation of the HVAC system. In response to determining that the concentration exceeds a predefined concentration threshold, the controller provides control signals to modify operation of the HVAC system and/or the leak management system. For example, the control signals generally instruct the airflow management assemblies to fluidly couple an interior space of the building to a purge exhaust outlet positioned upstream of a reversible supply fan. Then, the control signals activate the supply fan in reverse, thus purging the leaked refrigerant from the interior space of the building out of the purge exhaust outlet. The controller may also cause a device to transmit an alert indicative of the concentration of the refrigerant and/or stop operation of the HVAC system until the leak of refrigerant is resolved. In this manner, the leak management system enables the detection and mitigation of refrigerant leaks substantially before the refrigerant may reach the predefined concentration threshold.

While only certain features and embodiments of the present disclosure have been illustrated and described, many modifications and changes may occur to those skilled in the art, such as variations in sizes, dimensions, structures, shapes and proportions of the various elements, values of parameters such as temperatures, pressures, etc., mounting arrangements, use of materials, orientations, etc., without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the embodiments, all features of an actual implementation may not have been described, including those unrelated to the presently contemplated best mode of carrying out the disclosure, or those unrelated to enabling the claimed features. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A refrigerant leak management system for a heating, ventilation, and air conditioning (HVAC) unit configured to provide a conditioned interior space of a building, comprising:
   a return inlet assembly;
   a purge exhaust outlet assembly;
   a sensor configured to detect refrigerant proximate an air handling enclosure of the HVAC unit; and
   a controller configured to control the system to drive air from the conditioned interior space of the building into an external environment via the purge exhaust outlet assembly in response to the sensor detecting the refrigerant proximate the air handling enclosure by: actuating the return inlet assembly to close the return inlet assembly, actuating the purge exhaust outlet assembly to open the purge exhaust outlet assembly, and activating a reversible supply fan of the HVAC unit in a reverse direction.

2. The system of claim 1, wherein the return inlet assembly is configured to be disposed at a return inlet of the air handling enclosure of the HVAC unit, and the purge exhaust outlet assembly is configured to be disposed at a purge exhaust outlet of the air handling enclosure.

3. The system of claim 1, wherein the sensor is configured to detect refrigerant by detecting refrigerant-containing air.

4. The system of claim 1, wherein the controller is configured to activate the reversible supply fan in the reverse direction by reversing a polarity of power supplied to a reversible motor of the reversible supply fan.

5. The system of claim 1, wherein the controller is configured to actuate the return inlet assembly to open the return inlet assembly while the sensor does not detect the refrigerant proximate the air handling enclosure.

6. The system of claim 1, wherein the external environment is an unconditioned interior space of the building.

7. The system of claim 1, wherein the external environment is a space exterior to the building.

8. The system of claim 1, wherein the controller is configured to enable the HVAC unit to enter or remain in an ON-cycle configured to provide airflow to the conditioned interior space of the building while the sensor does not detect the refrigerant proximate the air handling enclosure.

9. The system of claim 1, wherein the purge exhaust outlet assembly comprises a barometric damper configured to open in response to activating the reversible supply fan in the reverse direction.

10. The system of claim 9, wherein the purge exhaust outlet assembly comprises a locking mechanism configured to selectively lock or unlock the barometric damper of the purge exhaust outlet assembly in response to signals from the controller, wherein the locking mechanism is configured to maintain the barometric damper in a closed position.

11. The system of claim 1, wherein the return inlet assembly, the purge exhaust outlet assembly, or both comprise a motorized damper configured to open in response to being actuated by the controller.

12. The system of claim 1, wherein the controller is configured to switch the HVAC unit to an OFF-cycle or prevent the HVAC unit from entering an ON-cycle while driving the air from the conditioned interior space of the building.

13. The system of claim 1, wherein the controller is configured drive at least a threshold quantity of the air from the conditioned interior space of the building.

14. The system of claim 1, wherein the HVAC unit comprises an interior HVAC unit of a split-type HVAC system.

15. An air handling system of a heating, ventilation, and air conditioning (HVAC) system configured to manage airflow with respect to a conditioned interior space of a building, comprising:
a return inlet having a return inlet assembly;
a purge exhaust outlet having a purge exhaust outlet assembly;
a sensor configured to detect refrigerant proximate an air handling enclosure;
a reversible supply fan configured to draw air from the conditioned interior space of the building when operating in a reverse direction; and
a controller configured to control the air handling system to purge the air into an external environment by operating the reversible supply fan in the reverse direction while the return inlet assembly is closed and the purge exhaust outlet assembly is open, in response to the sensor detecting the refrigerant proximate the air handling enclosure.

16. The system of claim 15, wherein the return inlet assembly comprises a barometric damper configured to be closed based on a signal from the controller in response to the reversible supply fan operating in the reverse direction.

17. The system of claim 15, wherein the purge exhaust outlet assembly comprises a barometric damper configured to be opened based on a signal from the controller in response to the reversible supply fan operating in the reverse direction.

18. The system of claim 15, wherein the return inlet assembly comprises a damper and a locking mechanism configured to selectively lock or unlock the damper in response to signals from the controller, wherein the controller is configured to actuate the locking mechanism to maintain the damper in a closed position when the supply fan is operating in the reverse direction.

19. The system of claim 15, wherein the controller is configured to actuate the return inlet assembly to open the return inlet while the sensor does not detect the refrigerant proximate the air handling enclosure.

20. The system of claim 15, wherein the controller is configured to enable the HVAC system to enter or remain in an ON-cycle that conditions the conditioned interior space of the building while the sensor does not detect the refrigerant proximate the air handling enclosure.

21. The system of claim 15, comprising a supply outlet and comprising a plurality of ducts that fluidly couple the return inlet to the conditioned interior space, the supply outlet to the conditioned interior space, and the purge exhaust outlet to the external environment.

22. The system of claim 15, comprising:
a second sensor disposed proximate the supply fan; and
a third sensor disposed within a duct that fluidly couples the air handling enclosure to the conditioned interior space, wherein:
the sensor comprises a first sensor disposed proximate an evaporator coil, and
the controller is configured to purge the air from the conditioned interior space in response to at least one of the first, second, and third sensors detecting the refrigerant proximate the air handling enclosure.

23. A method of operating a heating, ventilation, and air conditioning (HVAC) system that provides a conditioned interior space of a building, comprising:
in response to detecting, via a sensor, refrigerant proximate an air handling enclosure of the HVAC system:
activating a reversible supply fan of the HVAC system in a reverse direction to draw a flow of air from the conditioned interior space of the building;
closing a return inlet assembly disposed at a return inlet of the air handling enclosure to impede the flow of air from returning to the conditioned interior space of the building; and
opening a purge exhaust outlet assembly disposed at a purge exhaust outlet of the air handling enclosure to guide the flow of air to enter an external environment.

24. The method of claim 23, wherein, in response to detecting the refrigerant proximate the air handling enclosure, the reversible supply fan is activated, the return inlet assembly is closed, and the purge exhaust outlet assembly is opened at substantially the same time.

25. The method of claim 23, wherein the return inlet assembly closes and the purge exhaust outlet assembly opens in response to the flow of air drawn from the conditioned interior space of the building by activating the reversible supply fan.

26. The method of claim 23, comprising:
detecting additional refrigerant with the sensor after a threshold amount of time; and
increasing a fan speed of the reversible supply fan to draw the flow of air from the conditioned interior space at a greater rate.

27. The method of claim 23, comprising:
detecting that the refrigerant is mitigated after a threshold amount of time; and
opening the return inlet assembly, closing the purge exhaust outlet assembly, and enabling the HVAC system to enter an ON-cycle.

* * * * *